(12) United States Patent
Chou et al.

(10) Patent No.: US 6,413,051 B1
(45) Date of Patent: Jul. 2, 2002

(54) ARTICLE INCLUDING A COMPOSITE LAMINATED END PORTION WITH A DISCRETE END BARRIER AND METHOD FOR MAKING AND REPAIRING

(75) Inventors: Chen-Yu Jack Chou, Cincinnati; Gerald Alexander Pauley, Hamilton, both of OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/702,097

(22) Filed: Oct. 30, 2000

(51) Int. Cl.[7] .................................................. F01D 5/14
(52) U.S. Cl. ............................ 416/229 A; 416/241 A
(58) Field of Search ..................... 416/229 A, 241 A, 416/229 R; 29/402.11

(56) References Cited

U.S. PATENT DOCUMENTS

| | | | |
|---|---|---|---|
| 3,883,267 A | 5/1975 | Baudier et al. | 416/230 |
| 3,892,612 A | 7/1975 | Carlson et al. | 156/150 |
| 4,108,572 A | 8/1978 | Platt | 416/230 |
| 4,111,606 A | 9/1978 | Prewo | 416/224 |
| 4,118,147 A | 10/1978 | Ellis | 416/230 |
| 4,470,862 A | 9/1984 | More et al. | 156/245 |
| 5,375,978 A | 12/1994 | Evans et al. | 416/230 |
| 5,622,638 A | * 4/1997 | Schell et al. | 219/121.64 |
| 5,794,338 A | * 8/1998 | Bowden, Jr. et al. | 29/889.1 |

* cited by examiner

Primary Examiner—F. Daniel Lopez
Assistant Examiner—Dwayne J. White
(74) Attorney, Agent, or Firm—Nathan D. Herkamp; Lee H. Sachs

(57) ABSTRACT

An article including a body terminating in an end portion, for example an airfoil of a blade terminating in an airfoil tip, comprises an end or tip barrier discrete from and bonded with the body. The barrier is substantially impregnable to penetration of liquid, for example water vapor. In a form in which the body is laminated, the barrier is a non-directionally dependent material, resisting delamination. In one form of a method for making such article, the end portion of an existing article is trimmed back to provide a body preform, and an end barrier is bonded with the body preform. In another method form, an end barrier is bonded with a provided body preform, the barrier and body preform together defining the article. Such articles are repairable by removing and replacing a damaged end portion or damaged barrier.

19 Claims, 3 Drawing Sheets

ARTICLE INCLUDING A COMPOSITE LAMINATED END PORTION WITH A DISCRETE END BARRIER AND METHOD FOR MAKING AND REPAIRING

BACKGROUND OF THE INVENTION

This invention relates to an article including a composite laminated end portion, for example a tip portion of an airfoil. More particularly it relates to a discrete end or tip barrier bonded at a tip portion of the airfoil, and to a method for making and for repairing a end portion.

Articles such as blading members with airfoils, including fan blades, compressor blades, and various vanes and struts, made of laminated fiber reinforced composite materials, have been used in turbine engines for many years. Various of such composite airfoil structures and methods for making them have been reported in as such U.S. Patents as U.S. Pat. No. 3,883,267—Baudier et al (patented May 13, 1975); U.S. Pat. No. 3,892,612—Carlson et al. (patented Jul. 1, 1975); U.S. Pat. No. 5,375,978—Evans et al. (patented Dec. 27, 1994); and many others.

One important example of a laminated, fiber reinforced composite airfoil is a gas turbine engine composite fan blade reinforced with graphite or glass type fibers in a typical non-metallic resin or polymeric matrix generally described and used in the art. Therefore, the operating temperature capability of such an article can be limited, at least in part, by a Glass Transition Temperature (Tg). As the temperature of the resin matrix approaches the Tg, it becomes less rigid and behave in a "jelly-like" state. Such softening behavior of the resin is believed to be the result of activity and increased length of the resin polymeric chain at elevated temperatures.

In such a condition, the resin is more vulnerable to the absorption of liquid such as water, generally in the form of water vapor, at temperatures below the liquid's boiling point. For example, in a gas turbine engine, this can occur at lower operating temperatures, after engine shut down, etc. As a result of relatively high moisture content in the resin, the Tg can be reduced and the material strength can be reduced to below a design limit. In addition, the typical fiber reinforced structure in the airfoil tip portion, the laminations of which generally are exposed or terminate at an outer surface of the tip portion, can be more vulnerable to delamination that would increase the chance of detrimental moisture absorption. That is particularly significant in the event of a rub between the blade tip and an opposed, cooperating component such as a shroud, or fan case inner surface.

BRIEF SUMMARY OF THE INVENTION

The present invention provides an article with a discrete end barrier bonded with an end portion of an article, for example a laminated composite tip portion of an airfoil, as a barrier to penetration of fluid contacting the end portion, and as applicable as an inhibitor to delamination of a laminated end portion.

In one form, the invention provides an article comprising an airfoil extending between a leading edge and a trailing edge and including a laminated composite airfoil body of a first density, the airfoil terminating at one end in an airfoil end or tip portion. The airfoil tip portion comprises an end or tip barrier discrete from and bonded with the airfoil body. The tip barrier extends substantially between the leading edge and trailing edge and for a distance from a tip portion outer surface toward the airfoil body, and is of a second density substantially no greater than the first density of the airfoil body. The end or tip barrier comprises an end or tip barrier support, substantially impregnable to fluid and including therein passages communicating through the end portion outer surface. Fluid impregnable material is disposed within and closes the passages at least at the end or tip portion outer surface.

In another form, the present invention provides a method for making such an article. In forms of such a method, a laminated composite article, such as a blade, is made to an existing design shape. The portion of the article carrying the end portion, for example the airfoil, is trimmed from its end or tip for a selected distance to provide an article or airfoil body preform. In another form, an article body preform, such as a blade body preform, is made to a selected length that, with an end or tip barrier, will be of an existing design shape. The end or tip barrier support is disposed at the blade body preform and then the fluid impregnable material is disposed in and fills passages of the support. When bonded together, the end or tip barrier is. provided.

In still another form, the present invention provides a method for repairing a damaged end or tip portion of a service operated article, for example an airfoil. In such method, the damaged end or tip portion is removed, for example by machining, grinding, etc. to provide a body preform If a tip cap, for example of metal, has been disposed on lateral surfaces of an airfoil, the damaged tip portion can be removed without removing the tip cap from the airfoil. Then the article is repaired by disposing the end or tip barrier at the body preform, as described above.

DETAILED DESCRIPTION OF THE INVENTION

In the gas turbine engine art, one possible design arrangement to reduce or avoid tip rub and resulting delamination of an airfoil of a laminated composite rotating blading member, for example a compressor or fan blade, is to increase the clearance between a blade tip and a cooperating member such as a circumferentially disposed shroud, or fan case inner surface. However, increased clearance can result in loss of blade efficiency. When such an airfoil that included a metal tip cap was damaged such as by a rub, in most cases the damaged area could be repaired only by first removing the tip cap. However, such removal of the metal tip cap can result in secondary damage to the laminated airfoil, for example by removal of or damage to surface plies and possibly the underlying laminated composite.

Forms of the present invention provide an end or tip barrier that is replaceable and repairable, that resists damage from tip rub, and that avoids penetration or infiltration of liquids such as moisture. In one form, the invention provides an end or tip structure bonded with a laminated, composite portion or body of an article, for example an airfoil. Such structure is an end barrier inhibiting penetration of a liquid, such as water or water vapor, into the end or body portion. Because the structure is not laminated and is a substantially uniform structure that can include dispersed reinforcement, for example random fibers, it resists or avoids delamination. Such defined structure is referred to for simplicity herein as being "non-directionally dependent".

The barrier, bonded with an underlying portion of the article, in one embodiment comprises a fluid impregnable barrier support including therein passages communicating through an outer surface. A fluid impregnable material, for example a polymeric material such as a resin, is disposed within and closes the passages at least at an end or tip outer surface. The present invention will be more fully understood by reference to the drawings.

Figure 1:
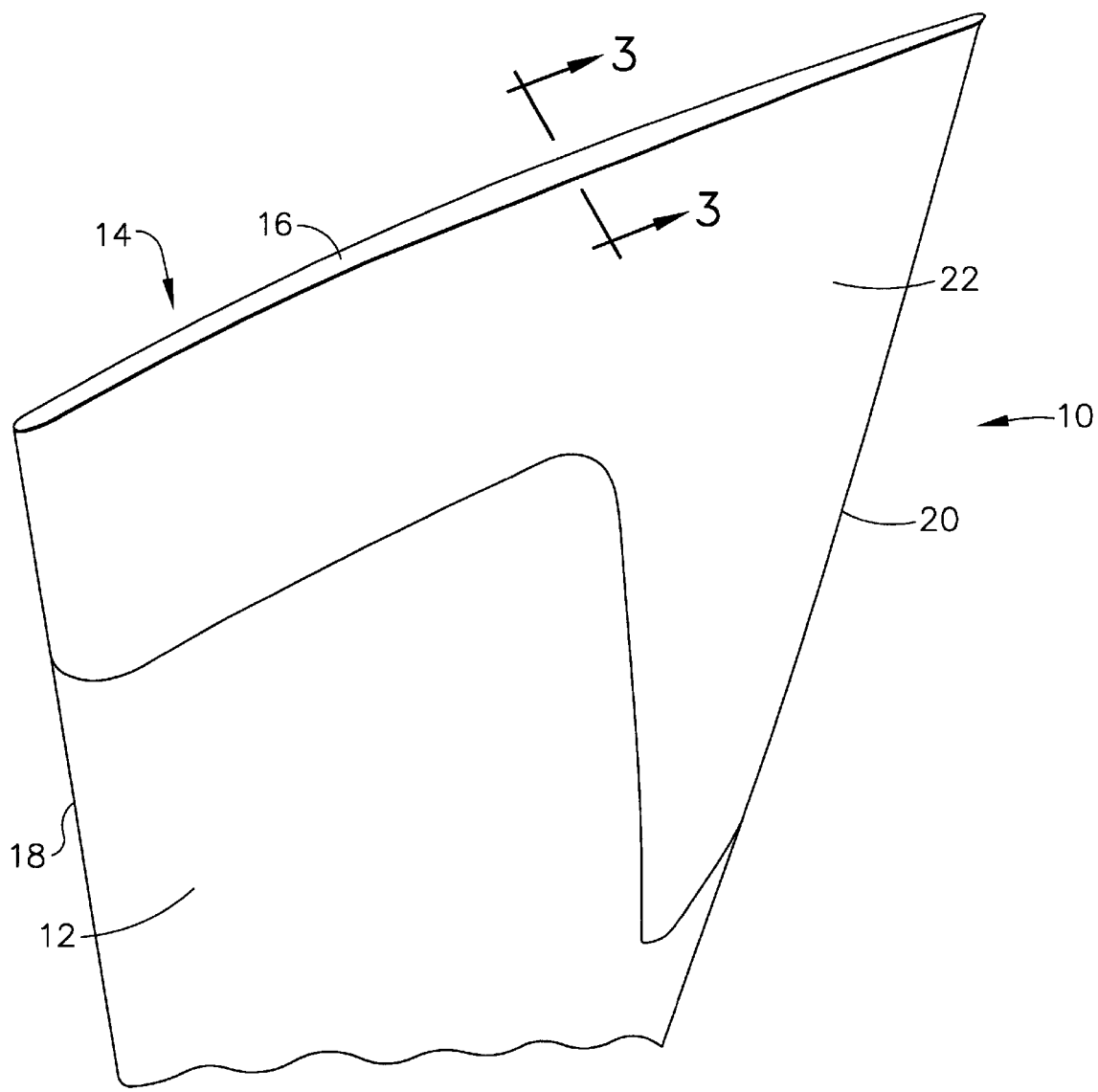
FIG. 1 is a fragmentary, perspective view of an airfoil of a gas turbine engine fan blade showing an airfoil body and an airfoil tip portion including a tip cap disposed on airfoil lateral surfaces at the tip portion.

The fragmentary, perspective view of FIG. 1 is an airfoil of a gas turbine engine rotating fan blade, shown generally at 10, as one example of an article in the form of a blading member with which the present invention can be practiced. Airfoil 10 includes an airfoil body 12 made of a laminated composite material, for example a commercially used glass or carbon fiber reinforced polymeric matrix, terminating in a radially outward end or tip portion shown generally at 14. Tip portion 14 has an end or tip outer surface 16. Airfoil body 12, tip portion 14, and outer surface 16 extend generally between leading edge 18 and trailing edge 20. In this embodiment, a metal tip cap 22, for example of a titanium alloy, is disposed in a manner well known in the art on lateral surfaces of airfoil 10 generally about tip portion 14.

Figure 2:
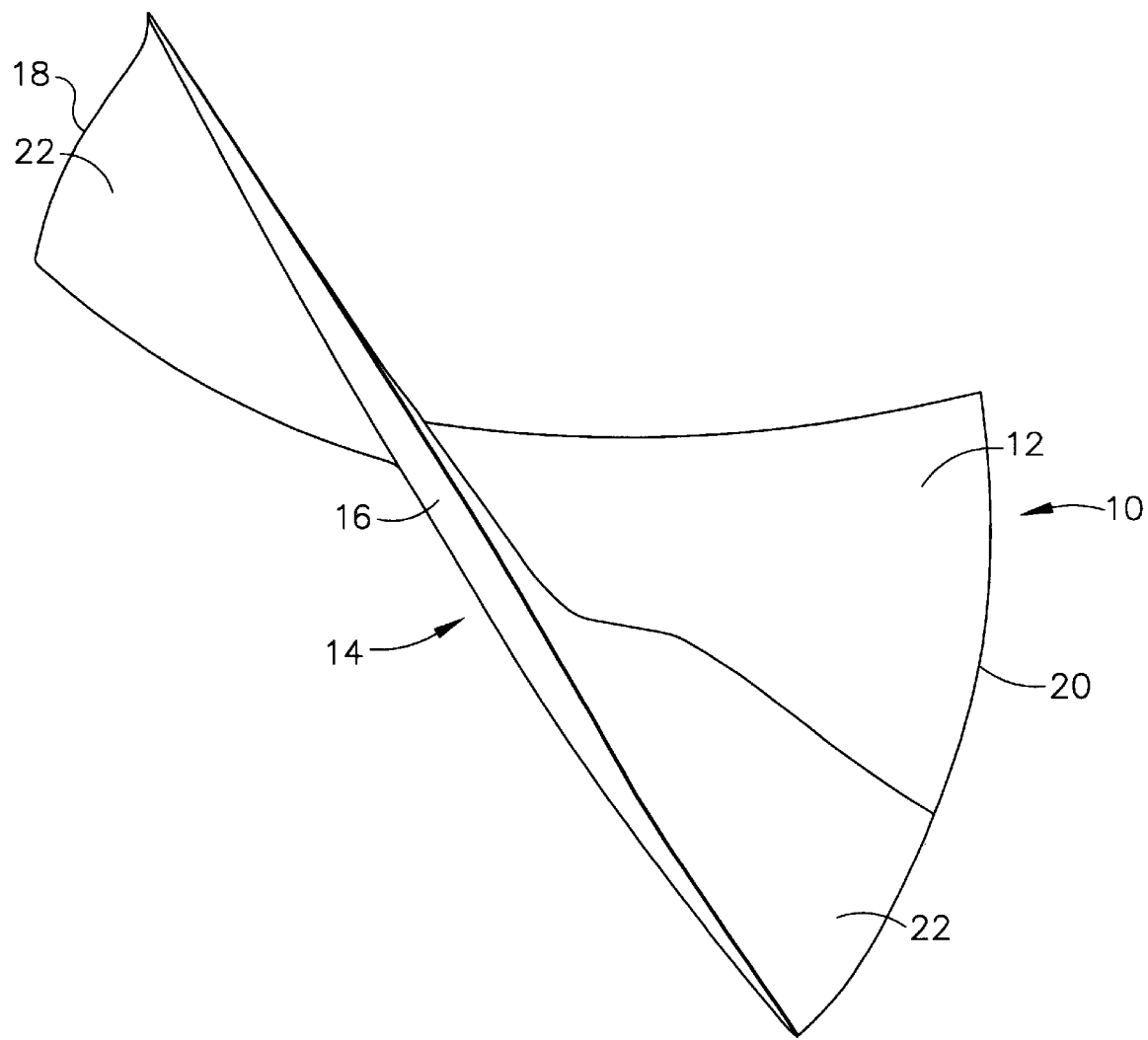
FIG. 2 is a top view of the airfoil of FIG. 1.

FIG. 2 is a top view of airfoil 10 of FIG. 1 showing the complex design shape or configuration of such article.

Figure 3:
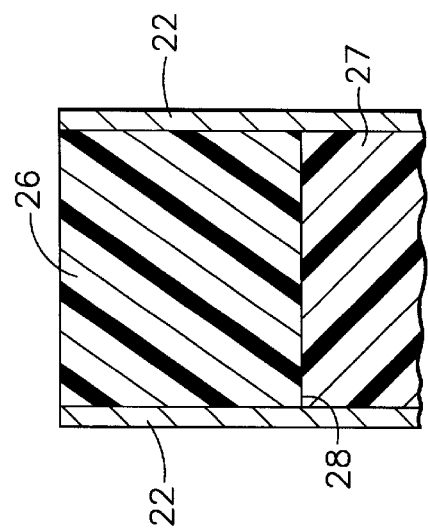
FIG. 3 is a fragmentary sectional view of the airfoil of FIG. 1, shown along lines 3—3.

FIG. 3 is a fragmentary sectional view of airfoil tip portion 14 shown along lines 3—3 of FIG. 1. In FIG. 3, the laminated composite material terminating at outer surface 16 is shown diagrammatically at 24. As was discussed above, tip portion 14 is subject to damage starting at tip outer surface 16 by penetration of water vapor and/or delamination, for example as a result of a rub on a cooperating member such as a circumferentially disposed stationary shroud or fan case inner surface.

Figure 4:
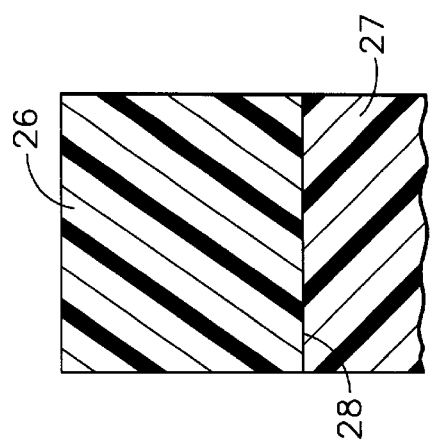
FIG. 4 is a fragmentary sectional view of an airfoil tip portion including the tip barrier of the present invention.
Figure 5:
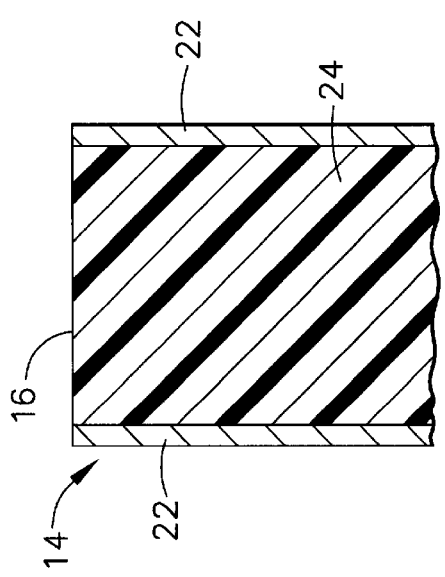
FIG. 5 is a fragmentary sectional view as in FIG. 4 with a metal tip cap disposed about the tip portion.

A form of the present invention is shown in the fragmentary sectional view of FIG. 4. In that embodiment, at least a radially outer portion of original end or tip portion 14 is replaced, within a design configuration or shape, with an end or tip barrier, shown diagrammatically at 26. Barrier 26 is bonded with article or airfoil body preform 27 at junction or bond 28. Barrier 26, an embodiment of which is shown and discussed in more detail in connection with FIGS. 6 and 7, substantially is impervious to penetration of fluids, for example water or water vapor, and, unlike a laminated composite, in this embodiment is a non-directionally dependent structure. Therefore, barrier 26 is not subject to delamination as is the material of replaced tip portion 14. The fragmentary sectional view of FIG. 5 shows another embodiment of the structure of FIG. 4, including tip cap 22 disposed about body 12 and barrier 26. For use in articles in which weight can be a factor, for example in aircraft gas turbine engine components particularly those such as fan or compressor blades that rotate during operation, the density of barrier 26 is no greater, and preferably is less, than the density of the article body portion or preform to which it is bonded.

Figure 6:
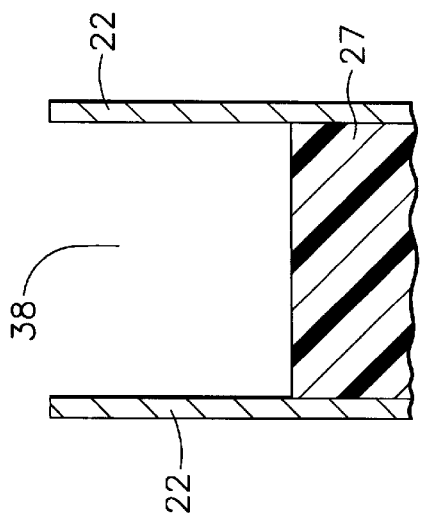
FIG. 6 is a fragmentary sectional view as in FIG. 5 showing the tip support of the tip barrier.
Figure 7:
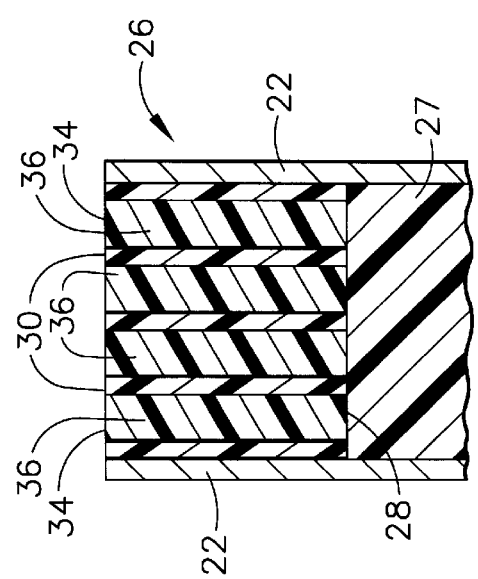
FIG. 7 is a fragmentary sectional view as in FIG. 6 with the tip support filled with a fluid impregnable material.
Figure 8:
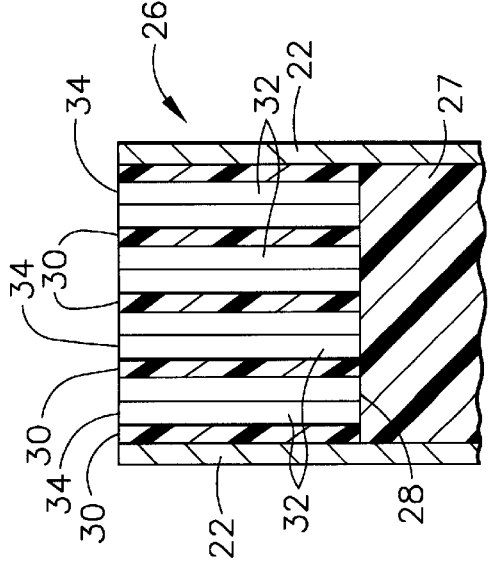
FIG. 8 is a fragmentary sectional view of the tip portion of FIGS. 5, 6 and 7 with a damaged portion removed for repair.

One example of the structure of barrier 26 is shown in more detail in the fragmentary sectional views of FIGS. 6 and 7. Barrier 26 comprises an end or tip barrier support 30 bonded with article body preform 27 and substantially impregnable to penetration of fluids. In this embodiment, barrier 26 includes therein passages 32 communicating or opening through end or tip portion outer surface 34. Examples of barrier support 30 for this embodiment include, but are not limited to, a honeycomb structure with cell openings facing generally outwardly through outer surface 34, as shown in FIGS. 6 and 7, and a porous or sponge-like structure with pores or passages therein open through outer surface 34. For use in articles such as aircraft gas turbine engine components and blading members in which weight can be a factor, barrier support 30 is made of a relatively light weight material such as a non-metallic or polymeric material.

As shown in the embodiment of FIG. 7, disposed in and closing passages 32 at least at barrier outer surface 34 is a non-metallic, polymeric fluid impregnable material 36 substantially impervious to the penetration of liquids, for example water, water vapor, moisture, etc. An example of material 36 is a curable epoxy resin system that in some forms includes therein strengthening ingredients such as fibers. Tip barrier 26 is bonded with airfoil body preform 27 at juncture or bond 28.

FIGS. 6 and 7 show one embodiment in which tip barrier 26 comprises support 30 in which material 36 is disposed. However, it should be understood that other forms of tip barrier 26 can be used in the practice of the present invention. For example, tip barrier 26 can be molded and/or shaped to a designed configuration from a curable polymeric material, such as an epoxy, with or without additional strengthening such as from whiskers enclosed within the material. This provides a non-directionally dependent, fluid impervious structure for bonding as an end portion of a body, for example as an insert between walls of a tip cap at an airfoil tip.

In one series of evaluations of the present invention, a tip barrier was bonded to an airfoil body preform of a gas turbine engine rotating composite fan blade made of carbon fiber reinforced polymeric laminations made from IM7/8551-7 material: IM7 graphite fiber in 8551 type resin. After the fan blade was fully cured in its manufacturing cycle, the blade airfoil tip was trimmed back by a selected distance of about one inch, as measured along a radial length dimension of the airfoil. This provided airfoil body preform 27 shown in FIGS. 4, 5, 6, 7, and 8. An airfoil shaped blade tip barrier 26 of a radial length dimension at least equal to the selected distance of about one inch was prepared and bonded with the airfoil body preform 27. The tip barrier 26 can be prepared to be larger than the design size and shape of the trimmed tip and later shaped, for example by machining or grinding, to the desired design shape.

In one evaluation to provide a relatively light weight tip barrier 26 for a rotating blading member, a tip barrier support 30 of a honeycomb structure, for example as shown in FIGS. 6 and 7, with a cell size in the range of about 0.125–0.25 inch, made of glass fiber or non-metallic material, was provided in the airfoil shape. The honeycomb was disposed with the cell openings facing generally radially outwardly. In this example, the spanwise dimension of the barrier support 30 was greater than that of the trimmed portion of the airfoil body preform 27. Then the barrier support 30 preliminarily was bonded with the airfoil body preform 27 using a commercial high temperature unsupported film adhesive at about 150° F. for about an hour.

Because the final configuration of this airfoil included a metal tip cap 22, a high temperature curing (for example in the range of about 300–325° F.) film adhesive, commercially available as AF191K material, was cut to match the shape of the tip cap. The film adhesive was applied about the barrier support 30 and airfoil body preform 27, then pressure bonded and cured at about 325° F. for about 2 hours. Thereafter, a high temperature epoxy resin system 36 marketed by the Dexter Corporation as Hysol EA 9396 material was injected into the open cells or passages 32 of the honeycomb barrier support 30. The resin system was cured at about 150° F. for about 90 minutes to provide a form of the tip barrier associated with the present invention, bonded with the airfoil body preform. After curing and prior to application of the metal tip cap, the tip barrier was trimmed to final design dimensions.

In these examples, the tip barrier 26, that through bonding with preform 27 became an integral part of the airfoil 10, was of a density of about 0.05 pounds per cubic inch, less than the density of the airfoil body 12 it replaced, at about 0.06 pounds per cubic inch. In this way, the weight of the final blade was reduced, particularly at its radially outer portion. A tip barrier density greater than that of the airfoil body could result in an undesirable increase in forces on the blade during operation.

The tip barrier protected the airfoil tip from penetration of water vapor and from delamination for a distance of up to about 1.5 inch from the tip outer surface. During moisture diffusion evaluations of gas turbine engine fan blades, it has been recognized that a tip barrier extending at least about 0.25" from the tip outer surface is required for adequate protection from water vapor. In addition, it was recognized that the tip barrier should not extend beyond about 1.5" from the tip outer surface in order to avoid an adverse effect on the fan blade chordwise bending stiffness. Therefore, a form of the present invention applied to a gas turbine engine fan blade includes a tip barrier having a radial thickness of, or extending in the range of, about 0.25–1.5" from the airfoil tip outer surface.

In the above example, separate heating and curing steps were conducted for the tip barrier support, the film adhesive, and the resin system injected into the passages of the barrier support. However, one or more of such separate steps can be combined for co-curing to simplify manufacturing. In one form during initial manufacture of a composite article such as a laminated airfoil, final curing of the article itself can include curing of a tip barrier disposed for bonding on an airfoil body, with or without the adhesive for tip cap bonding.

An end or tip barrier can be prepared within the scope of the present invention separately from the article, as an attachment or as an insert within a tip cap for bonding with the article or airfoil body preform. Forms of such tip or end barriers, in addition to the resin filled honeycomb structure described above, include molded barriers or barriers shaped from a prepared material. The density of end or tip barriers can be reduced for lighter weight operation by including, within the internal structure of the barrier, a low density material such as a polymeric material with closed voids or internal porosity, for example using commercially available hollow microspheres.

Embodiments of the present invention provide an end or tip barrier that is repairable and replaceable, including replacement without removal of a tip cap disposed on a lateral surface about an end or tip of an article such as a rotating turbine engine blade. If damaged, all or part of an end or tip portion of an article, or the end or tip barrier associated with the present invention can be removed from the body of the article and replaced as described above. In one example of such a repair and replacement, a tip barrier of the type shown in FIGS. 5, 6, and 7, or an end or tip portion of an article of the type shown in FIG. 3, and that has been damaged during operation, can be removed from within tip cap 22 such as by grinding, machining, or other means. Such removal can be accomplished without removal of tip cap 22. This provides a cavity 38 within at least a portion of tip cap 22, as shown in the fragmentary sectional view of FIG. 8. A replacement tip barrier then can be disposed within cavity 38 and bonded to airfoil body preform 27, or to a remaining portion of the original tip barrier, by the various methods described above, in place or as a separate insert.

The present invention has been described, in various embodiments and forms in connection with specific examples and combinations. However, it should be understood that they are intended to be typical of rather than in any way limiting on the scope of the present invention. Those skilled in the various arts associated with this invention will understand that it is capable of variations and modifications without departing from the scope of the appended claims.

What is claimed is:

1. An article including a body terminating in an end portion, wherein:
    the end portion comprises an end barrier discrete from and bonded wit the body,
    the end barrier being substantially impregnable to penetration of fluid contacting the end barrier;
    the body is a laminated composite material; and,
    the end barrier is a non-directionally dependent material.

2. The article of claim 1 in which the body is of a first density and the end barrier is of a second density no greater than the first density.

3. The article of claim 1 in which:
    the body and the end portion comprise an airfoil extending between a leading edge and a trailing edge and terminating at one end in the end barrier as an airfoil tip barrier;
    the body is a laminated reinforced composite material of a first density; and,
    the tip barrier is a non-directionally dependent material that is resistant to delamination and is of a second density no greater than the first density.

4. The article of claim 1 in the form of a turbine engine rotating blading member comprising an airfoil extending between a leading edge and a trailing edge and terminating at one end in an airfoil tip portion, the airfoil including a laminated composite airfoil body of a first density, wherein:
    the airfoil tip portion comprises an airfoil tip barrier discrete from and bonded with the airfoil body, the tip barrier extending substantially between the leading edge and the trailing edge and for a distance from a tip portion outer surface toward the airfoil body.

5. The article of claim 4 in which an airfoil tip cap is disposed about at least a portion of a lateral surface of the airfoil tip portion.

6. The article of claim 4 in the form of a gas turbine engine fan blade in which the distance the tip barrier extends and is closed from the tip portion outer surface toward the airfoil body is in the range of about 0.25–1.5".

7. The article of claim 4 in which the tip barrier comprises:
    a tip barrier support substantially impregnable to penetration by fluid and including therein passages communicating through the tip portion outer surface; and, a fluid impregnable polymeric material disposed within the passages and closing the passages at least at the tip barrier outer surface.

8. The article of claim 7 in which:

the tip barrier support comprises a honeycomb structure including cells open generally through the tip portion outer surface; and, the polymeric material is disposed within the cells closing the cells at least at the tip barrier outer surface.

9. In a method for making an article including a body terminating in an end portion, the steps of:

making the article to an existing design shape;

trimming the end portion of the article for a selected distance to provide a body preform;

providing an end barrier of a material substantially impregnable to penetration of liquid and of a shape including at least the design shape and including a dimension at least of the selected distance; and, bonding the end barrier to the body preform.

10. The method of claim 9 in which the article is made of a laminated composite material to the existing design shape, and the end barrier is made of a non-directionally dependent material.

11. The method of claim 10 for making a turbine engine rotating blading member including an airfoil terminating at an airfoil tip portion, in which:

the airfoil tip portion is trimmed to provide an airfoil body preform; and, the end barrier is provided as an airfoil tip barrier.

12. The method of claim 11 in which the airfoil tip barrier is provided comprising a tip barrier support including therein passages communicating through a tip barrier outer surface, and a fluid impregnable polymeric material is disposed within the passages and closing the passages at least at the tip barrier outer surface.

13. The method of claim 12 in which the airfoil tip barrier is bonded to the airfoil body preform by first bonding the tip barrier support to the airfoil body preform and then disposing the polymeric material in the passages.

14. The method of claim 13 in which the tip barrier support comprises a honeycomb structure including cells generally open through the tip barrier outer surface.

15. In a method for making an article including a body terminating in an end portion, the article being of an existing design shape and size including a first dimension at which the end portion terminates, the steps of:

making a body preform of a shape including at least the existing shape and a size including a second dimension less than the first dimension by a distance;

providing an end barrier of a material substantially impregnable to penetration to liquid and of a shape including at least the existing shape and including a third dimension at least equal to the distance; and, bonding the end barrier to the body preform.

16. The method of claim 15 in which the body preform is made of a laminated composite material substantially to the existing design shape, and the end barrier is made of a non-directionally dependent material.

17. The method of claim 16 for making a turbine engine rotating blading member of an existing design shape including an airfoil terminating at an airfoil tip portion, the first dimension being the radial length of the airfoil, in which:

the body preform is made substantially in the existing design shape and of a size in which the second dimension, as measured along the radial length of the airfoil, is less than the first dimension by the distance; and, an airfoil tip barrier is provided as the end barrier in a shape at least including the existing airfoil shape, the third dimension being at least equal to the distance as measured along the radial length of the airfoil.

18. In a method for repairing a damaged end portion of a laminated composite article comprising a laminated body of a design shape terminating in the end portion, the steps of:

removing the damaged end portion from the body to provide a body preform;

providing a discrete end barrier as a replacement for the damaged end portion, the discrete end barrier being of a non-directionally dependent material substantially impregnable to penetration of liquid and of a shape including at least the design shape; and, bonding the discrete end barrier to the body preform.

19. The method of claim 18 for repairing a damaged airfoil tip portion of a laminated composite airfoil of a turbine engine blading member including an airfoil tip cap bonded about at least a portion of a lateral surface of the airfoil tip portion, comprising the steps of:

removing the damaged airfoil tip portion from the airfoil body to provide a body preform within at least a portion of the tip cap without removal of the tip cap from the lateral surface to provide a tip cavity;

providing the end barrier as an airfoil tip barrier insert shaped to fit within the tip cavity as a replacement for the removed damaged airfoil tip portion;

disposing the insert within the tip cavity; and, bonding the insert to the body preform.

* * * * *